United States Patent
Wyllie et al.

(10) Patent No.: US 11,334,877 B2
(45) Date of Patent: May 17, 2022

(54) SECURITY TOOL

(71) Applicant: Bank of America Corporation, Charlotte, NC (US)

(72) Inventors: Graham Marshall Wyllie, Charlotte, NC (US); Christopher Lamont Rice, Charlotte, NC (US)

(73) Assignee: Bank of America Corporation, Charlotte, NC (US)

(*) Notice: Subject to any disclaimer, the term of this patent is extended or adjusted under 35 U.S.C. 154(b) by 332 days.

(21) Appl. No.: 16/272,449

(22) Filed: Feb. 11, 2019

(65) Prior Publication Data
US 2020/0258077 A1 Aug. 13, 2020

(51) Int. Cl.
*G06Q 20/36* (2012.01)
*G01S 19/25* (2010.01)
(Continued)

(52) U.S. Cl.
CPC ......... *G06Q 20/3674* (2013.01); *G01S 19/25* (2013.01); *G06Q 20/4016* (2013.01);
(Continued)

(58) Field of Classification Search
CPC .......... G06Q 20/3674; G06Q 20/4016; G06Q 20/4093; G06Q 20/40145; G01S 19/25; G10L 17/24; G06N 20/00
See application file for complete search history.

(56) References Cited

U.S. PATENT DOCUMENTS 6,330,546 B1 * 12/2001 Gopinathan et al. ... G06F 17/60
705/35
6,879,960 B2  4/2005 Nascenzi et al.
(Continued)

FOREIGN PATENT DOCUMENTS

AU  2014309187 B2 *  8/2014  ............. G06F 17/00

OTHER PUBLICATIONS

Fred O Williams, How to Avoid Unnecessary Fraud Freezes in the Wake of Equifax Breach, creditcards.com (Sep. 29, 2017), https://www.creditcards.com/credit-card-news/tighter-fraud-security-freezes-more-accounts. (Year: 2017).*
(Continued)

*Primary Examiner* — Patrick McAtee
*Assistant Examiner* — Terry Nathan Murray (57) ABSTRACT

A processor receives global positioning system data from a mobile device of a user of an account. The processor further receives information from a vendor, indicating that a transaction using the account was attempted. The processor determines, based on historical transaction and location information, and current transaction information, a probability that the transaction is fraudulent. In response, the processor rejects the transaction, and deactivates a card and mobile wallet of the user. The processor also sends a notification to the mobile device requesting a voice confirmation. The processor receives the voice confirmation, splits it into a set of voice characteristic data and determines, based on voice characteristic data stored in memory, that the voice confirmation was generated by the user. In response, the processor reactivates the card and the mobile wallet and stores a set of information describing the transaction in memory.

20 Claims, 5 Drawing Sheets

(51) Int. Cl.
  *G06Q 20/40* (2012.01)
  *G10L 17/24* (2013.01)
  *G06N 20/00* (2019.01)

(52) U.S. Cl.
  CPC ... *G06Q 20/4093* (2013.01); *G06Q 20/40145* (2013.01); *G10L 17/24* (2013.01); *G06N 20/00* (2019.01)

(56) References Cited

U.S. PATENT DOCUMENTS

| | | |
|---|---|---|
| 7,843,332 B2 | 11/2010 | Miller et al. |
| 7,847,685 B2 | 12/2010 | Miller et al. |
| 8,135,413 B2 | 3/2012 | Dupray |
| 8,566,227 B2 | 10/2013 | Carroll et al. |
| 8,583,492 B2 | 11/2013 | Connell |
| 8,635,134 B2 | 1/2014 | Rose et al. |
| 9,047,640 B2 | 6/2015 | Kingston et al. |
| 9,799,071 B1 | 10/2017 | Wilson et al. |
| 9,842,334 B1* | 12/2017 | Magi et al. ............ G06Q 40/08 |
| 10,755,281 B1* | 8/2020 | Yip et al. ................ G06Q 40/00 |
| 2004/0153663 A1* | 8/2004 | Clark .................. G06Q 40/025 726/25 |
| 2013/0159008 A1* | 6/2013 | Mills ..................... G06Q 10/06 705/2 |
| 2014/0009539 A1 | 1/2014 | Nozawa et al. |
| 2014/0331136 A1* | 11/2014 | Desmons ............ G06F 16/9537 715/719 |
| 2015/0221027 A1 | 8/2015 | Rose et al. |
| 2017/0255989 A1 | 9/2017 | Calio |
| 2017/0287489 A1* | 10/2017 | Biswal et al. .......... G10L 17/06 |
| 2018/0013748 A1 | 1/2018 | Paya et al. |

OTHER PUBLICATIONS

Williams, Fred; How to avoid uncessary fraud, Sep. 2017 (Year: 2017).*

* cited by examiner

SECURITY TOOL

TECHNICAL FIELD

This disclosure relates generally to security and fraud prevention.

BACKGROUND

The convenience offered by credit and debit cards has made them the preferred method of payment for many consumers. At the same time, mobile wallets are also gaining in popularity. Because a large proportion of consumers carry a mobile device with them at most times, mobile wallets—used to store the credit card and/or other financial information of the mobile device owner on the device—offer additional convenience, as they obviate the need for such consumers to carry around physical wallets in addition to their mobile devices. Both physical payment cards and mobile wallets, however, are susceptible to fraud.

SUMMARY OF THE DISCLOSURE

The convenience offered by credit and debit cards has made them the preferred method of payment for many consumers. At the same time, mobile wallets are also gaining in popularity. Since a large proportion of consumers carry a mobile device with them at most times, mobile wallets—used to store the credit card and/or other financial information of the mobile device owner on the device—offer additional convenience, as they obviate the need for such consumers to carry around physical wallets in addition to their mobile devices. Both physical payment cards and mobile wallets, however, are susceptible to fraud.

Credit/debit card fraud can occur as a result of the use of a stolen credit or debit card, of the use of a stolen mobile device containing a mobile wallet, or of the use of stolen data associated with a credit or debit card, such as the account number, expiration date of the card, and security code. In the latter case, stolen personal information can be used directly to make fraudulent purchases online or encoded onto the magnetic stripe of a counterfeit card and used to make in-person purchases. Because a counterfeit card may display the actual name and signature of the user (but be encoded with a fraud victim's account information), traditional techniques used by merchants to detect fraud—such as requesting a piece of photo-ID from the cardholder or comparing a signature of the cardholder to the signature on the back of the card—may be ineffective in such cases. Although the use of chip and pin technology has recently helped to decrease the instances of in-person credit and debit card fraud, many merchants have yet to implement chip-readers in their payment terminals. Furthermore, because credit and debit cards with the new chip technology still contain a magnetic stripe—present as a fallback mechanism in case the chip becomes damaged—a stolen or counterfeit card may be used, even if the pin associated with the account is not known, simply by claiming that the card's chip is damaged.

Fraudulent use of credit and debit accounts results in billions of dollars in losses each year for card providers and merchants. To help control these losses, card providers often employ fraud detection tools to flag potentially fraudulent account activity. Such tools look for unusual behavior in a consumer's purchases compared to their historical transactions. For example, if a consumer typically spends less than a thousand dollars each month and only shops at discount clothing stores, a fraud detection tool will likely flag a transaction for five thousand dollars, attempted using the consumer's payment card, at a designer boutique. However, by relying only on a consumer's historical transactions, such tools are highly susceptible to both false positives and false negatives. For example, if a transaction is not sufficiently anomalous compared to a consumer's previous transactions, existing fraud detection tools likely will not identify it as fraudulent. Therefore, even though a consumer spends every Monday evening at his/her child's soccer practice, a fraud detection tool likely will not flag a transaction for groceries at the opposite end of town during that same time period. As a result, consumers should continuously monitor their account statements for fraudulent charges, which they then identify to their payment card provider to obtain reimbursement. On the other hand, existing fraud detection tools may also flag legitimate transactions as fraudulent simply because they are not typical of a consumer's previous card-based spending habits, without considering other factors that may point to the transaction's legitimacy. For example, if a consumer visits multiple designer boutiques in the weeks leading up to a large transaction at one such boutique this may lend greater legitimacy to the transaction, as it may indicate that the consumer is shopping for a special event, such as a wedding. However, fraud detection tools only have knowledge of the single anomalous transaction and will likely flag it as potentially fraudulent. Consumers often become frustrated when providers freeze their accounts as a result of anomalous, but nevertheless valid charges. This is especially true given the time and effort used by a consumer to reactivate his/her account, which typically involves phoning and speaking with a customer service representative. Such frustration may lead customers to refrain from using those cards for which their accounts were unnecessarily frozen, resulting in lost revenue for the issuing institution.

This disclosure contemplates a security tool that addresses one or more of the above issues. The tool uses the fact that most people now carry mobile devices capable of transmitting global positioning system data on their persons to determine the probability a given transaction is fraudulent based not only on a consumer's previous transactions, but also on the previous locations to which the consumer has travelled. In this manner, certain embodiments reduce the occurrences of false positives and false negatives compared to previous fraud detection tools. When the tool determines that a transaction is likely fraudulent, it sends a notification to the mobile device of the account holder requesting vocal confirmation in order to proceed with the transaction. Once the security tool receives the vocal confirmation from the mobile device, it compares it to vocal data previously collected from the account holder and stored in memory. Upon determining that the vocal confirmation did, in fact, come from the account holder, the tool authorizes the transaction. Thus, certain embodiments of the security tool offer not only enhanced account security, but also improved procedures by which users can regain access to their frozen accounts. Certain embodiments of the security tool are described below.

According to one embodiment, an apparatus includes a memory and a hardware processor communicatively coupled to the memory. The memory stores a first log that includes historical transaction information, a second log that includes historical location information, and a third log that includes a first set of voice characteristic data assigned to a user of an account. The processor receives global positioning system data from a mobile device of the user of the account and stores the global positioning system data in the second log. The processor further receives account information from a vendor, indicating that a transaction using the account was attempted. The processor additionally determines, based on the historical transaction information stored in the first log, the historical location information stored in the second log, an amount of the transaction, a time of the transaction, and a location of the vendor, a probability that the transaction is fraudulent. The processor further determines that the probability that the transaction is fraudulent is greater than a set threshold. In response to determining that the probability that the transaction is fraudulent is greater than the set threshold, the processor rejects the transaction, deactivates a card assigned to the user of the account, and deactivates a mobile wallet stored on the mobile device of the user of the account. The processor also sends a notification to the mobile device indicating fraudulent activity has been detected and requesting a voice confirmation. The processor further receives the voice confirmation from the mobile device. The processor then splits the voice confirmation into a second set of voice characteristic data and determines, based on a comparison between the second set of voice characteristic data and the first set of voice characteristic data, that the voice confirmation was generated by the user of the account. In response to determining that the voice confirmation was generated by the user of the account, the processor reactivates the card and the mobile wallet and stores a set of information describing the transaction in the first log. The set of information includes the location of the vendor, the time of the transaction, and the amount of the transaction. The processor further determines that the probability that the transaction is fraudulent is less than the set threshold. In response to determining that the probability that the transaction is fraudulent is less than the set threshold, the processor authorizes the transaction.

According to another embodiment, a method includes receiving global positioning system data from a mobile device of a user of an account and storing the global positioning system data in a second log including historical location information. The method also includes receiving account information from a vendor. The account information indicates that a transaction using the account was attempted. The method further includes determining, based on historical transaction information stored in a first log, the historical location information stored in the second log, an amount of the transaction, a time of the transaction, and a location of the vendor, a probability that the transaction is fraudulent. The method also includes determining that the probability that the transaction is fraudulent is greater than a set threshold. In response to determining that the probability that the transaction is fraudulent is greater than the set threshold, the method further includes rejecting the transaction, deactivating a card assigned to the user of the account, and deactivating a mobile wallet stored on the mobile device of the user of the account. The method also includes sending a notification to the mobile device indicating fraudulent activity has been detected and requesting a voice confirmation. The method additionally includes receiving the voice confirmation from the mobile device. The method further includes splitting the voice confirmation into a second set of voice characteristic data, and determining, based on a comparison between the second set of voice characteristic data and a first set of voice characteristic data assigned to the user of the account and stored in a third log, that the voice confirmation was generated by the user of the account. In response to determining that the voice confirmation was generated by the user of the account, the method includes reactivating the card and the mobile wallet and storing a set of information describing the transaction in the first log. The set of information includes the location of the vendor, the time of the transaction, and the amount of the transaction. The method further includes determining that the probability that the transaction is fraudulent is less than the set threshold. In response to determining that the probability that the transaction is fraudulent is less than the set threshold, the method also includes authorizing the transaction.

According to a further embodiment, a system includes a storage element and a processing element communicatively coupled to the storage element. The storage element is operable to store a first log including historical transaction information, a second log including historical location information, and a third log including a first set of voice characteristic data assigned to a user of an account. The processing element is operable to receive global positioning system data from a mobile device of the user of the account and store the global positioning system data in the second log. The processing element is further operable to receive account information from a vendor, indicating that a transaction using the account was attempted. The processing element is additionally operable to determine, using a machine learning algorithm, based on the historical transaction information stored in the first log, the historical location information stored in the second log, an amount of the transaction, a time of the transaction, and a location of the vendor, a probability that the transaction is fraudulent. The processing element is further operable to determine that the probability that the transaction is fraudulent is greater than a set threshold. In response to determining that the probability that the transaction is fraudulent is greater than the set threshold the processing element is operable to reject the transaction, deactivate a card assigned to the user of the account, and deactivate a mobile wallet stored on the mobile device of the user of the account. The processing element is also operable to send a notification to the mobile device indicating fraudulent activity has been detected and requesting a voice confirmation. The processing element is additionally operable to receive the voice confirmation from the mobile device. The processing element is further operable to split the voice confirmation into a second set of voice characteristic data and determine, based on a comparison between the second set of voice characteristic data and the first set of voice characteristic data, that the voice confirmation was generated by the user of the account. In response to determining that the voice confirmation was generated by the user of the account, the processing element is operable to reactivate the card and the mobile wallet. The processing element is also operable to store a set of information describing the transaction in the first log. The set of information includes the location of the vendor, the time of the transaction, and the amount of the transaction. The processing element is further operable to determine that the probability that the transaction is fraudulent is less than the set threshold. In response to determining that the probability that the transaction is fraudulent is less than the set threshold, the processing element is operable to authorize the transaction.

Certain embodiments provide one or more technical advantages. For example, an embodiment improves security and reduces fraud in commercial transactions involving payment cards, such as debit or credit cards and/or mobile wallets. As another example, an embodiment increases the accuracy of fraud detection, resulting in fewer false positives and false negatives compared to conventional fraud detection tools. As a further example, an embodiment prevents fraudulent use of a payment card, such as a debit or credit card and/or a mobile wallet. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Embodiments of the present disclosure and its advantages are best understood by referring to FIGS. 1 through 5 of the drawings, like numerals being used for like and corresponding parts of the various drawings.

The convenience offered by credit and debit cards has made them the preferred method of payment for many consumers. At the same time, mobile wallets are also gaining in popularity. Since a large proportion of consumers carry a mobile device with them at most times, mobile wallets—used to store the credit card and/or other financial information of the mobile device owner on the device—offer additional convenience, as they obviate the need for such consumers to carry around physical wallets in addition to their mobile devices. Both physical payment cards and mobile wallets, however, are susceptible to fraud.

Credit/debit card fraud can occur as a result of the use of a stolen credit or debit card, the use of a stolen mobile device containing a mobile wallet, or the use of stolen data associated with a credit or debit card, such as the account number, expiration date of the card, and security code. In the latter case, stolen personal information can be used directly to make fraudulent purchases online or encoded onto the magnetic stripe of a counterfeit card and used to make in-person purchases. Because a counterfeit card may display the actual name and signature of the user (but be encoded with a fraud victim's account information), traditional techniques used by merchants to detect fraud—such as requesting a piece of photo-ID from the cardholder or comparing a signature of the cardholder to the signature on the back of the card—may be ineffective in such cases. Although the use of chip and pin technology has recently helped to decrease the instances of in-person credit and debit card fraud, many merchants have yet to implement chip-readers in their payment terminals. Furthermore, because credit and debit cards with the new chip technology still contain a magnetic stripe—present as a fallback mechanism in case the chip becomes damaged—a stolen or counterfeit card may be used, even if the pin associated with the account is not known, simply by claiming that the card's chip is damaged.

Fraudulent use of credit and debit accounts results in billions of dollars in losses each year for card providers and merchants. To help control these losses, card providers often employ fraud detection tools to flag potentially fraudulent account activity. Such tools look for unusual behavior in a consumer's purchases compared to their historical transactions. For example, if a consumer typically spends less than a thousand dollars each month and only shops at discount clothing stores, a fraud detection tool will likely flag a transaction for five thousand dollars, attempted using the consumer's payment card, at a designer boutique. However, by relying only on a consumer's historical transactions, such tools are highly susceptible to both false positives and false negatives. For example, if a transaction is not sufficiently anomalous compared to a consumer's previous transactions, existing fraud detection tools likely will not identify it as fraudulent. Therefore, even though a consumer spends every Monday evening at his/her child's soccer practice, a fraud detection tool likely will not flag a transaction for groceries at the opposite end of town during that same time period. As a result, consumers should continuously monitor their account statements for fraudulent charges, which they then identify to their payment card provider to obtain reimbursement. On the other hand, existing fraud detection tools may also flag legitimate transactions as fraudulent simply because they are not typical of a consumer's previous card-based spending habits, without considering other factors that may point to the transaction's legitimacy. For example, if a consumer visits multiple designer boutiques in the weeks leading up to a large transaction at one such boutique this may lend greater legitimacy to the transaction, as it may indicate that the consumer is shopping for a special event, such as a wedding. However, fraud detection tools only have knowledge of the single anomalous transaction and will likely flag it as potentially fraudulent. Consumers often become frustrated when providers freeze their accounts as a result of anomalous, but nevertheless valid charges. This is especially true given the time and effort used by a consumer to reactivate his/her account, which typically involves phoning and speaking with a customer service representative. Such frustration may lead customers to refrain from using those cards for which their accounts were unnecessarily frozen, resulting in lost revenue for the issuing institution.

This disclosure contemplates a security tool that addresses one or more of the above issues. The tool uses the fact that most people now carry mobile devices capable of transmitting global positioning system data on their persons to determine the probability a given transaction is fraudulent based not only on a consumer's previous transactions, but also on the previous locations to which the consumer has travelled. In this manner, certain embodiments reduce the occurrences of false positives and false negatives compared to previous fraud detection tools. When the tool determines that a transaction is likely fraudulent, it sends a notification to the mobile device of the account holder requesting vocal confirmation in order to proceed with the transaction. Once the security tool receives the vocal confirmation from the mobile device, it compares it to vocal data previously collected from the account holder and stored in memory. Upon determining that the vocal confirmation did, in fact, come from the account holder, the tool authorizes the transaction. Thus, certain embodiments of the security tool offer not only enhanced account security, but also improved procedures by which users can regain access to their frozen accounts. The security tool will be described in more detail using FIGS. 1 through 5.

Figure 1:
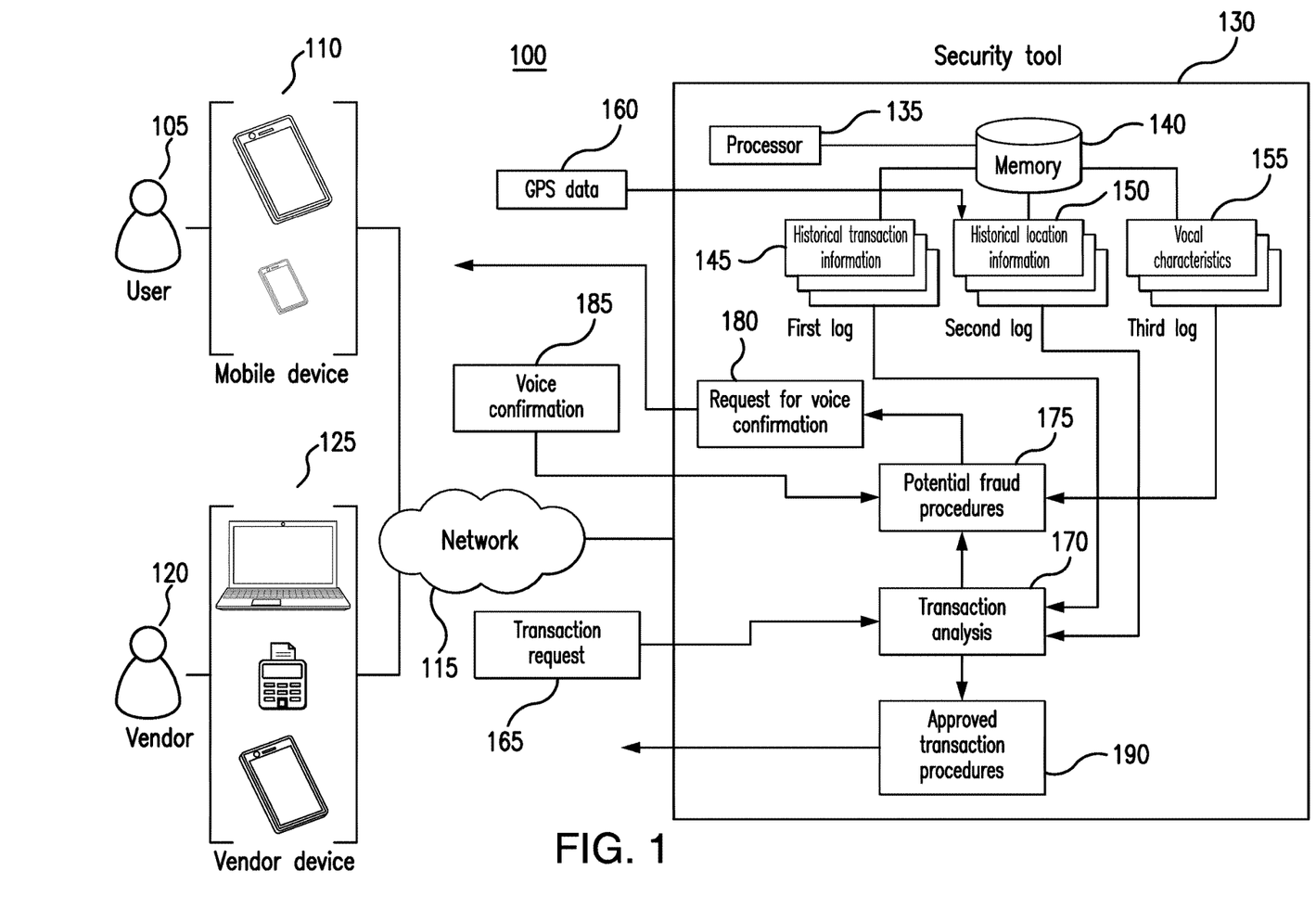
FIG. 1 illustrates an example system.

FIG. 1 illustrates an example system 100. As seen in FIG. 1, system 100 includes one or more mobile devices 110, one or more vendor devices 125, a network 115, and a security tool 130. Generally, security tool 130 receives a transaction request 165 from a vendor device 125 indicating that a user 105 is attempting to complete a transaction with a vendor 120 using a payment card or a mobile wallet. Security tool 130 uses historical transaction information 145 and historical location information 150 associated with user 105 to perform transaction analysis component 170, in which security tool 130 determines a probability that the transaction is fraudulent. If the probability that the transaction is fraudulent is less than a set threshold, security tool 130 sends a message to vendor device 125 approving the transaction. On the other hand, if the probability that the transaction is fraudulent is greater than the set threshold, security tool 130 implements potential fraud procedures component 175 in which security tool 130 deactivates the payment card and/or mobile wallet associated with user 105 and sends a request 180 to mobile device 110 for a voice confirmation 185 from user 105. Security tool 130 then compares voice confirmation 185 to vocal characteristic data 155 for user 105 stored in memory 140. If security tool 130 determines that voice confirmation 185 was in fact produced by user 105, security tool 130 authorizes the transaction.

Users 105 carry mobile devices 110 on their persons. Mobile devices 110 are used to transmit global positioning system (GPS) data 160 to security tool 130. Security tool 130 then stores the GPS data 160 in second log 150 in memory 140. As discussed below, in the discussion of FIG. 2, transaction analysis component 170 uses the historical location information obtained from mobile devices 110 and stored in second log 150 to help determine the probability a transaction associated with a transaction request 165 is fraudulent. Mobile devices 110 also receive requests 180 from security tool 130 for voice confirmations 185. In certain embodiments, requests for voice confirmations 180 include requests that the individual in possession of mobile device 110 speak a phrase displayed in the notification. In certain other embodiments, requests for voice confirmations 180 include requests that the individual in possession of mobile device 110 speak the authentication phrase assigned to the user 105 of mobile device 110. This may be desirable for an added level of protection against fraud, since only user 105 should know the authentication phrase associated with his/her payment account.

Mobile devices 110 include any appropriate device for communicating with components of system 100 over network 115. For example, mobile devices 110 may be a mobile phone, a laptop, a tablet, and/or an automated assistant. This disclosure contemplates mobile device 110 being any appropriate portable device for sending and receiving communications over network 115. As an example, and not by way of limitation, device 110 may be a laptop, a wireless or cellular telephone, an electronic notebook, a personal digital assistant, a tablet, or any other device capable of receiving, processing, storing, and/or communicating information with other components of system 100. Mobile device 110 may also include a user interface, such as a display, a microphone, keypad, or other appropriate terminal equipment usable by user 105. In some embodiments, an application executed by mobile device 110 may perform the functions described herein.

Vendors 120 use vendor devices 125 to initiate transactions with users 105 for goods or services. A vendor device 125 receives information associated with a payment account belonging to a user 105 through a credit card, debit card, mobile wallet, or any other payment device belonging to user 105. Vendor device 125 then sends this account information to security tool 130 as a transaction request 165. As discussed in greater detail below, in the discussion of FIG. 2, transaction analysis component 170 of security tool 130 then analyses transaction request 165 and determines a probability that transaction request 165 corresponds to a fraudulent transaction. If security tool 130 determines that the probability the transaction is fraudulent is less than a set threshold, or security tool 130 receives a voice confirmation 185 from user 105 authorizing the transaction, security tool 130 sends vendor device 125 a message instructing vendor device to approve the transaction, as part of approved transaction procedures 190.

Vendor devices 125 include any appropriate device for receiving payment information from users 105 and communicating with components of system 100 over network 115. For example, vendor devices 125 may be a payment terminal, a cash register, a telephone, a mobile phone, a computer, a laptop, a tablet, and/or an automated assistant. This disclosure contemplates vendor device 125 being any appropriate device for sending and receiving communications over network 115. As an example, and not by way of limitation, vendor device 125 may be a computer, a laptop, a wireless or cellular telephone, an electronic notebook, a personal digital assistant, a tablet, a payment terminal or any other device capable of receiving, processing, storing, and/or communicating information with other components of system 100. Vendor device 125 may also include a user interface, such as a display, a microphone, keypad, or other appropriate terminal equipment usable by vendor 120. In some embodiments, an application executed by vendor device 125 may perform the functions described herein.

Network 115 facilitates communication between and amongst the various components of system 100. This disclosure contemplates network 115 being any suitable network operable to facilitate communication between the components of system 100. Network 115 may include any interconnecting system capable of transmitting audio, video, signals, data, messages, or any combination of the preceding. Network 115 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

As seen in FIG. 1, security tool 130 includes a processor 135 and a memory 140. This disclosure contemplates processor 135 and memory 140 being configured to perform any of the functions of security tool 130 described herein. Generally, security tool 130 executes transaction analysis component 170 in which it analyses a transaction request 165 received from a vendor device 125 and determines a probability that the transaction is fraudulent, based on historical transaction information stored in first log 145 in memory 140 and historical location information stored in second log 150 in memory 140.

In certain embodiments, security tool 130 uses machine learning to determine the probability that a transaction is fraudulent. For example, in certain embodiments, security tool 130 uses a machine learning model to determine the probability that the transaction requested by vendor device 125 is of a type user 105 would likely engage in. In certain embodiments, security tool 130 then uses historical location information 150, along with the current GPS location of mobile device 110 to determine the probability a user 105 is at the location of vendor 120. For example, if mobile device 110 is at a location ten miles from vendor 120, this may indicate that the attempted transaction is likely fraudulent. However, if the location ten miles from vendor 120 is a location user 105 spends a great deal of time at (such as the user's home or office)—as determined from historical location information 150—there is likely a lower probability that the transaction is fraudulent, since user 105 may have simply left his/her mobile device 110 at his/her home or office instead of taking it with him/her to the location of vendor 120. In further embodiments, security tool 130 may use a second machine learning model to determine the probability user 105 is at the location of vendor 120, as discussed in detail below. Once security tool 130 has determined the probability that the transaction requested is of a type user 105 would likely engage in, and the probability that user 105 is at the location of vendor 120, security tool 130 may combine the two probabilities to determine a total probability that the transaction is fraudulent.

This disclosure contemplates that security tool 130 may use a machine learning method to determine the probability a user 105 is at the location of vendor 120 by determining a best fit model for the user's historical location information 150. By way of illustration, a machine learning model may split the user's historical location information 150 into a set of features, assign variable weights to each feature, and then determine the optimal value for each weight. In certain embodiments, the set of features may include the GPS coordinates of each of the user's locations, the time the user arrives at each of the locations, the day of the week the user is at each location, and the length of time the user stays at each location, among others. Once security tool 130 has trained and tested a machine learning model, it can use the model to predict the user's location at a certain day and time. Then, if a user 105 attempts a transaction at a location significantly different from the model's prediction, security tool 130 will assign a higher likelihood of fraud to the transaction than if the transaction took place at the predicted location. For example, if a user 105 is typically at a soccer field every Monday from 6:00 pm-7:00 pm, the model will likely predict that user 105 will be at the same soccer field the following Monday from 6:00 pm-7:00 pm. Therefore, if a transaction is attempted using one of the user's payment cards or mobile wallet at a location 30 miles from the soccer field at 6:30 pm the following Monday, security tool 130 will assign a higher probability of fraud to the transaction than if the transaction had been attempted across the street from the soccer field.

This disclosure contemplates that security tool 130 may use a machine learning method to determine the probability that the transaction requested by vendor device 125 is of a type user 105 would likely engage in, by applying a classification model to historical transaction information 145. As an example, in certain embodiments, security tool 130 may store information about both fraudulent transactions and legitimate transactions in first log 145. Then, security tool 130 may split both types of historical transaction information into a set of features and determine a decision tree based on these features. For example, security tool 130 may determine that the greatest indicator of fraud is if the attempted transaction is for an amount greater than $50,000. Consequently, the first step of the resulting decision tree, will ask whether the attempted transaction is for an amount greater than $50,000. The method will then iteratively determine the importance of the remaining features to form the decision tree. In certain embodiments, in addition to the amount of the transaction, the set of features may include the time of the transaction, the location of the vendor 120, and the type of goods and/or services sold by the vendor 120, among others.

In further embodiments, security tool 130 may use a single machine learning model to determine the probability that a requested transaction is fraudulent. For example, security tool 130 may use a classification model as described above, but in which additional features for the model are generated using the historical location information 150. Such features could include the maximum/minimum distance user 105 was from vendor 120 throughout the day, week, or month leading up to the transaction, and/or the location of user 105 exactly one day or week earlier than the attempted transaction, among others. Additionally, this disclosure contemplates that security tool 130 will continually update the chosen machine learning model(s) as it gathers additional historical location information 150 and historical transaction information 145.

Processor 135 is any electronic circuitry, including, but not limited to microprocessors, application specific integrated circuits (ASIC), application specific instruction set processor (ASIP), and/or state machines, that communicatively couples to memory 140 and controls the operation of security tool 130. Processor 135 may be 8-bit, 16-bit, 32-bit, 64-bit or of any other suitable architecture. Processor 135 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 135 may include other hardware and software that operates to control and process information. Processor 135 executes software stored on memory to perform any of the functions described herein. Processor 135 controls the operation and administration of security tool 130 by processing information received from network 115, mobile device(s) 110, vendor device(s) 125, and memory 140. Processor 135 may be a programmable logic device, a microcontroller, a microprocessor, any suitable processing device, or any suitable combination of the preceding. Processor 135 is not limited to a single processing device and may encompass multiple processing devices.

Memory 140 may store, either permanently or temporarily, data, operational software, or other information for processor 135. Memory 140 may include any one or a combination of volatile or non-volatile local or remote devices suitable for storing information. For example, memory 140 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 140, a disk, a CD, or a flash drive. In particular embodiments, the software may include an application executable by processor 135 to perform one or more of the functions described herein.

Memory 140 also stores a first log 145 containing historical transaction information for each user 105, a second log 150 containing historical location information for each user 105, and a third log 155 containing vocal characteristic data for each user 105. The historical transaction information stored in first log 145 includes details of approved transactions submitted as transaction requests 165 by vendor devices 125. In certain embodiments, the historical transaction information stored in first log 145 additionally includes details of declined/fraudulent transactions submitted as transaction requests 165 by vendor devices 125. In certain embodiments, the transaction details include the time of the transaction, the location of the vendor, and the amount of the transaction. The historical location information stored in second log 150 comes from GPS data 160 submitted by mobile device 110 belonging to user 105. In certain embodiments, the historical location information includes the GPS coordinates of each of the user's locations, the time the user arrived at each of the locations, the day of the week the user was at each location, and the length of time the user stayed at each location, among others. Finally, the vocal characteristic data stored in third log 155 includes information about the voice of a user 105 that security tool 130 uses to compare to voice confirmation 185 submitted by mobile device 110 in order to verify the user's identity. In certain embodiments, the information about the voice of a user 105 includes a recording of the user's voice. In further embodiments, the information about the voice of a user 105 includes information about the pitch, timber, intonation, and tone of the user's voice.

In certain embodiments, memory 140 additionally stores an authentication phrase assigned to user 105 of mobile device 110. In such cases, voice confirmation 185, used by security tool 130 to confirm that user 105 has knowledge of an attempted transaction, includes the authentication phrase spoken by user 105. This may be desirable for an added level of protection against fraud, since only user 105 should know the authentication phrase associated with his/her payment account.

In certain embodiments, system 100 offers enhanced security to users 105 of payment cards (such as debit or credit cards) and/or mobile wallets. By using information about a user's historical movements 150 and historical transactions 145, security tool 130 is able to determine the likelihood a given transaction initiated with a user's payment card or mobile wallet is fraudulent. By relying on historical location information 150 in addition to historical transaction information 145, certain embodiments of system 100 reduce the number of false positives and false negatives generated by security tool 130, in comparison with existing fraud detection tools.

Figure 2:
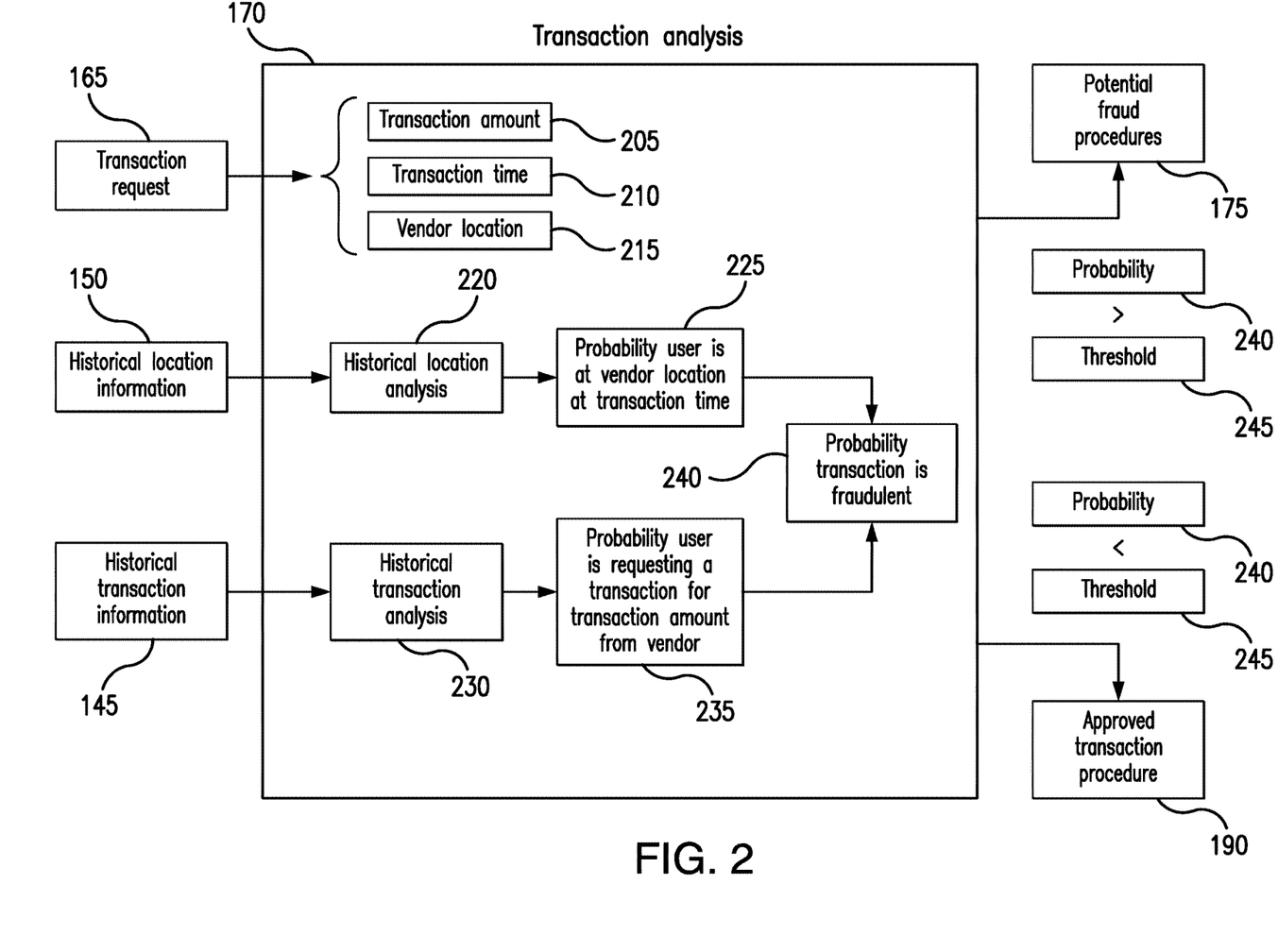
FIG. 2 illustrates the transaction analysis component of the security tool in the system of FIG. 1.

FIG. 2 illustrates transaction analysis component 170 of security tool 130. Transaction analysis component 170 is a software module stored in memory 140 and executed by processor 135. Transaction analysis component 170 considers a transaction request 165 submitted to security tool 130 by a vendor device 125 and determines the probability that the transaction is fraudulent. To do this, transaction analysis component 170 first extracts a set of information from transaction request 165 including the amount of the transaction 205, the time of the transaction 210, and the vendor location 215. Transaction analysis component 170 then uses this information along with historical transaction information 145 and historical location information 150 to determine a probability 240 that the attempted transaction is fraudulent. FIG. 2 illustrates a particular embodiment in which this determination includes three steps: (1) security tool 130 performs historical location analysis 220 on the historical location information 150 to determine a probability 225 that user 105 is at vendor location 215 at the transaction time 210; (2) security tool 130 performs historical transaction analysis 230 on the historical transaction information 145 to determine a probability 235 that user 105 is requesting a transaction for transaction amount 205 from vendor 120; and (3) security tool 130 uses probability 225 and probability 235 to determine a final probability 240 that the transaction is fraudulent. However, this disclosure contemplates that in certain embodiments security tool 130 can perform a single, combined analysis of historical location information 150 and historical location information 145 to directly determine the probability 240 that the transaction is fraudulent.

In certain embodiments, security tool 130 uses machine learning to determine the probability that a transaction request 165 is fraudulent. For example, in certain embodiments, security tool 130 uses a machine learning model to determine the probability that the transaction requested by vendor device 125 is of a type user 105 would likely engage in. In certain embodiments, security tool 130 then uses historical location information 150, along with the current GPS location of mobile device 110 to determine the probability a user 105 is at the location of vendor 120. For example, if mobile device 110 is at a location ten miles from vendor 120, this may indicate that the attempted transaction is likely fraudulent. However, if the location ten miles from vendor 120 is a location user 105 spends a great deal of time at (such as the user's home or office)—as determined from historical location information 150—there is likely a lower probability that the transaction is fraudulent, since user 105 may have simply left his/her mobile device 110 at his/her home or office instead of taking it with him/her to the location of vendor 120. In further embodiments, security tool 130 may use a second machine learning model to determine the probability user 105 is at the location of vendor 120, as discussed in detail below. Once security tool 130 has determined the probability that the transaction requested is of a type user 105 would likely engage in, and the probability that user 105 is at the location of vendor 120, security tool 130 may combine the two probabilities to determine a total probability that the transaction is fraudulent.

This disclosure contemplates that the machine learning method used by security tool 130 to determine probability 225 includes determining a best fit model for the user's historical location information 150. By way of illustration, a machine learning model may split the user's historical location information 150 into a set of features, assign variable weights to each feature, and then determine the optimal value for each weight. In certain embodiments, the set of features may include the GPS coordinates of each of the user's locations, the time the user arrives at each of the locations, the day of the week the user is at each location, and the length of time the user stays at each location, among others. Once security tool 130 has trained and tested a machine learning model, it can use the model to predict a user's location at a certain day and time. Then, if a user 105 attempts a transaction at a location significantly different from the model's prediction, security tool 130 will assign a higher likelihood of fraud to the transaction than if the transaction took place at the predicted location. For example, if a user 105 is typically at a soccer field every Monday from 6:00 pm-7:00 pm, the model will likely predict that user 105 will be at the same soccer field the following Monday from 6:00 pm-7:00 pm. Therefore, if a transaction is attempted using one of the user's payment cards or mobile wallet at a location 30 miles from the soccer field at 6:30 pm the following Monday, security tool 130 will assign a higher probability of fraud to the transaction than if the transaction had been attempted across the street from the soccer field.

This disclosure contemplates that security tool 130 may use a machine learning method to determine probability 230 that includes determining a classification model for historical transaction information 145. As an example, in certain embodiments, security tool 130 may store information about both fraudulent transactions and legitimate transactions in first log 145. Then, security tool 130 may split both types of historical transaction information into a set of features and determine a decision tree based on these features. For example, security tool 130 may determine that the greatest indicator of fraud is if an attempted transaction is for an amount greater than $50,000. Consequently, the first step of the resulting decision tree, will ask whether the attempted transaction is for an amount greater than $50,000. The method will then iteratively determine the importance of the remaining features to form the decision tree. In certain embodiments, in addition to the amount of the transaction, the set of features may include the time of the transaction, the location of the vendor 120, and the type of goods and/or services sold by the vendor 120, among others.

In further embodiments, security tool 130 may use a single machine learning model to determine the probability that a requested transaction is fraudulent. For example, security tool 130 may use a classification model as described above, but in which additional features for the model are generated using the historical location information 150. Such features could include the maximum/minimum distance user 105 was from vendor 120 throughout the day, week, or month leading up to the transaction, and/or the location of user 105 exactly one day or week earlier than the attempted transaction, among others. Additionally, this disclosure contemplates that security tool 130 will continually update the chosen machine learning model(s) as it gathers additional historical location information 150 and historical transaction information 145.

Once transaction analysis component 170 of security tool 130 has determined probability 240 that the attempted transaction is fraudulent, security tool 130 next compares probability 240 to a set threshold 245. If probability 240 is greater than the set threshold 245, security tool 130 treats transaction request 165 as likely fraudulent and proceeds to execute potential fraud procedures component 175. This component is described in further detail below in the discussion of FIGS. 3A and 3B. On the other hand, if probability 240 is less than the set threshold 245, security tool 130 treats transaction request 165 as not likely fraudulent and proceeds to execute the approved transaction procedures component 190. This component is described in further detail below in the discussion of FIG. 4.

In certain embodiments, the value for the set threshold is set by the card/mobile wallet provider. For example, the provider may choose a value for the set threshold that maximizes revenue, taking into account revenue lost due to reimbursements made to users 105 for false negatives—in which security tool 130 approves a transaction that is actually fraudulent—and revenue lost due to dissatisfied users, who choose to use alternative payment methods after becoming frustrated over having their payment declined as a result of false positives.

In further embodiments, user 105 is able to adjust the set threshold by sending a request to security tool 130. For example, a user 105 may wish to lower the set threshold prior to attempting transactions that are not typical of the user's past behavior.

Figure 3A:
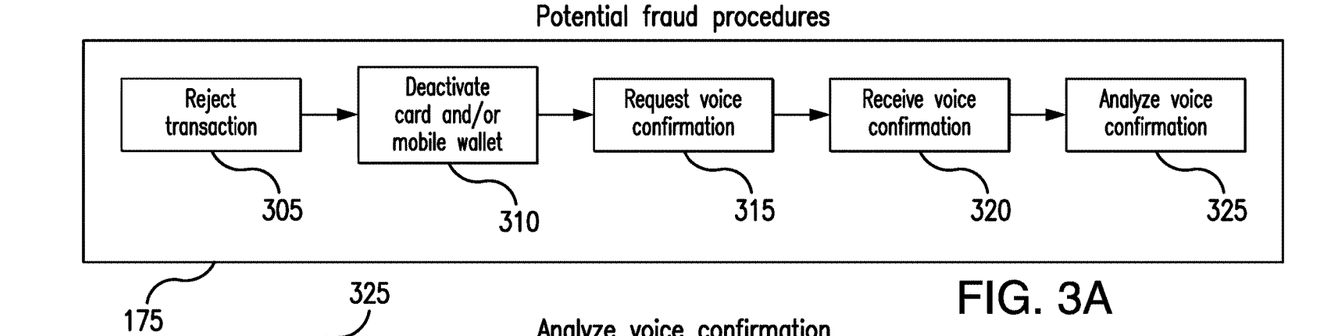
FIGS. 3A and 3B illustrate the potential fraud procedures component of the security tool in the system of FIG. 1.
Figure 3B:
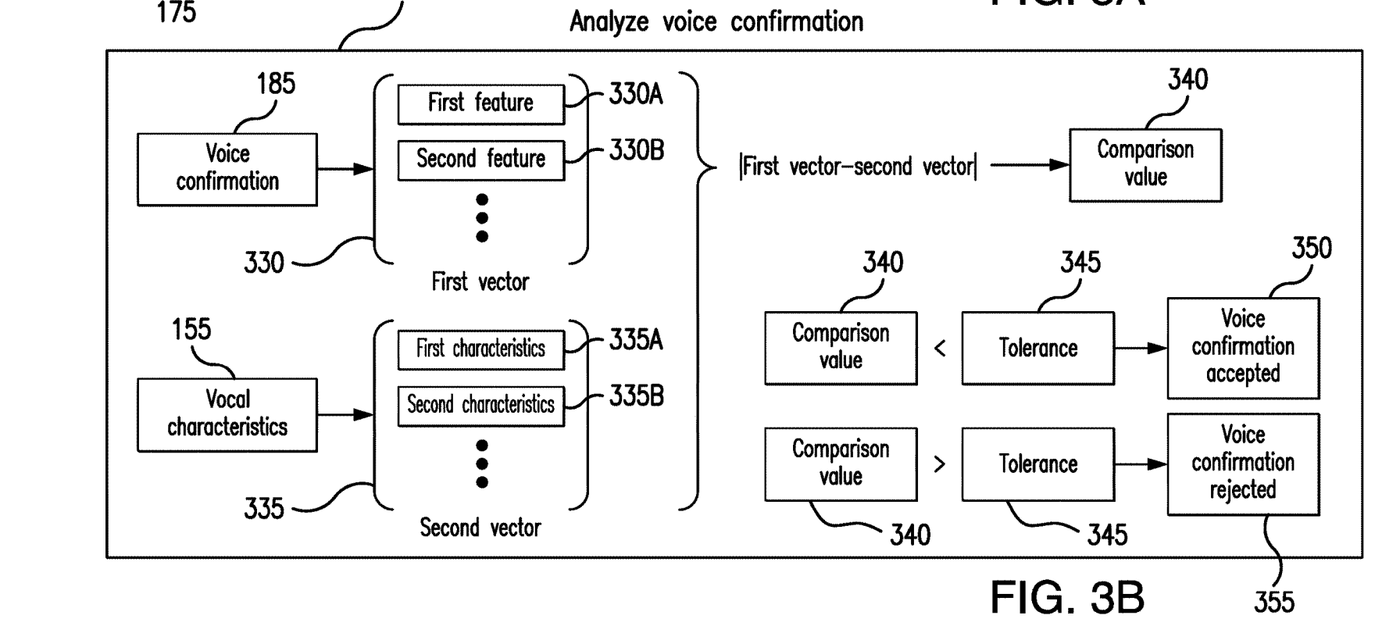

FIGS. 3A and 3B illustrate the actions taken by potential fraud procedures component 175 of security tool 130. FIG. 3A provides an overview of these actions, while FIG. 3B provides details of the steps taken by the analyze voice confirmation component 325 of potential fraud procedures component 175, which analyzes a voice confirmation 185 received from mobile device 110.

Once security tool 130 determines that an attempted transaction is likely fraudulent, it executes potential fraud procedures component 175, illustrated in FIG. 3A. Potential fraud procedures component 175 is a software module stored in memory 140 and executed by processor 135. Potential fraud procedures component 175 includes a subset of components 305 through 325 that are executed by processor 135. First, processor 135 executes component 305, which rejects the transaction. Then, processor 135 executes component 310, whereby security tool 130 deactivates the payment card and/or mobile wallet assigned to user 105. Processor 135 further executes component 315, in which security tool 130 sends a request 180 to a mobile device 110 seeking a voice confirmation from user 105 approving the transaction.

In certain embodiments, requests for voice confirmations 180 include requests that the individual in possession of mobile device 110 speak a phrase displayed in the notification. In certain other embodiments, requests for voice confirmations 180 include requests that the individual in possession of mobile device 110 speak the authentication phrase assigned to the user 105 of mobile device 110. This may be desirable for an added level of protection against fraud, since only user 105 should know the authentication phrase associated with his/her payment account.

Processor 135 additionally executes component 320, through which security tool 130 receives voice confirmation 185 from mobile device 110. Security tool 130 then analyzes voice confirmation 185 to confirm that voice confirmation 185 was actually produced by user 105, using component 325.

FIG. 3B illustrates the process by which security tool 130 analyzes voice confirmation 185 using component 325 of potential fraud procedures component 175. This analysis includes a comparison of a set of vocal characteristics extracted from voice confirmation 185 to vocal characteristics 155 stored in memory 140 for user 105. In certain embodiments, this comparison includes forming a first vector 330 using the vocal characteristics of voice confirmation 185, such as first feature 330A and a second feature 330B, and forming a second vector 335 using the vocal characteristics 155 for user 105 stored in memory 140, such as first characteristic 335A and second characteristic 335B. In certain embodiments, the vocal characteristics 155 include a recording of the user's voice. In further embodiments, the vocal characteristics include information about the pitch, timber, intonation, and tone of the user's voice. Then, security tool 130 determines a comparison value 340 based on the distance between the two vectors. If comparison value 340 is less than a set tolerance 345, security tool 130 assumes that voice confirmation 185 was produced by user 105, and that user 105 has therefore confirmed that the attempted transaction is legitimate. Security tool 130 therefore accepts voice confirmation 185 at step 350 and proceeds to execute approved transaction procedures component 190. If comparison value 340 is greater than the set tolerance 345, security tool 130 assumes that voice confirmation 185 was produced by someone other than user 105 (someone attempting to fool security tool 130). Security tool 130 therefore assumes the attempted transaction is in fact fraudulent and rejects voice confirmation 185, at step 355.

In certain embodiments, once security tool 130 has rejected voice confirmation 185, security tool 130 takes no further action relating to transaction request 165. In further embodiments, once security tool 130 has rejected voice confirmation 185, security tool 130 stores details of transaction request 165 in first log 145, including the fact that the attempted transaction was fraudulent. In certain embodiments, this fraudulent transaction information is used by transaction analysis component 170 of security tool 130 to determine the probability that future transaction requests 165 are fraudulent.

Figure 4:
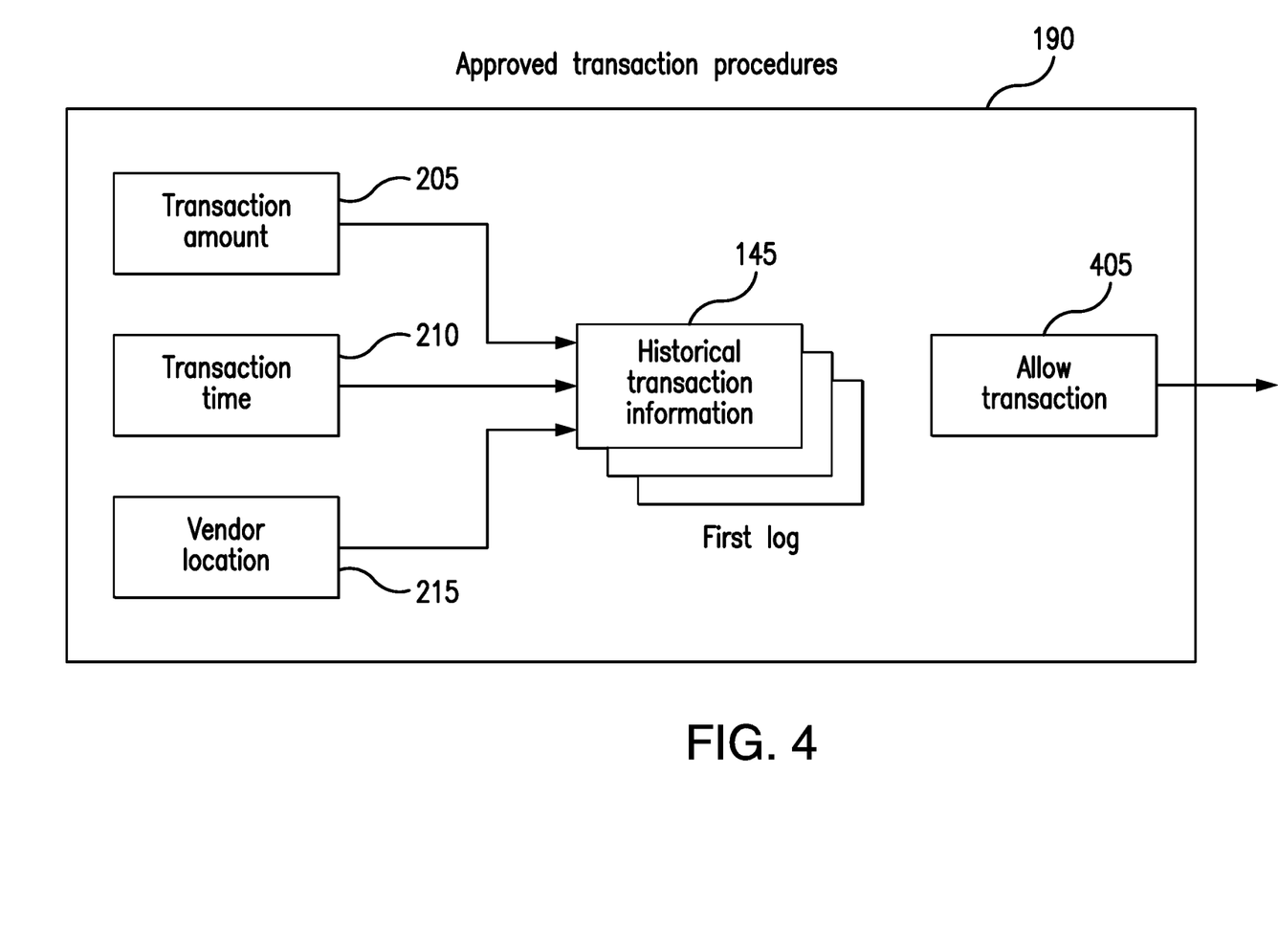
FIG. 4 illustrates the approved transaction procedures component of the security tool in the system of FIG. 1.

FIG. 4 illustrates approved transaction procedures component 190, executed by security tool 130 following either: (1) a determination by transaction analysis component 170 of security tool 130 that the probability a transaction request 165 corresponds to a fraudulent transaction is less than the set threshold, or (2) an acceptance of voice confirmation 185 by the potential fraud procedures component 175 of security tool 130.

Approved transaction procedures component 190 is a software module stored in memory 140 and executed by processor 135. Approved transaction procedures component 190 includes storing details of transaction request 165 in first log 145. In certain embodiments these details include the transaction amount 205, the transaction time 210, and the vendor location 215. This information can later be used by transaction analysis component 170 to help determine the probability that a future transaction request 165 is fraudulent. In certain embodiments in which security tool 130 also stores details of fraudulent transactions in first log 145, the fact that transaction request 165 corresponded to a legitimate transaction is also stored as part of the details of the transaction, in first log 145. Additionally, approved transaction procedures component 190 sends a message 405 to vendor device 125 approving the transaction.

Figure 5:
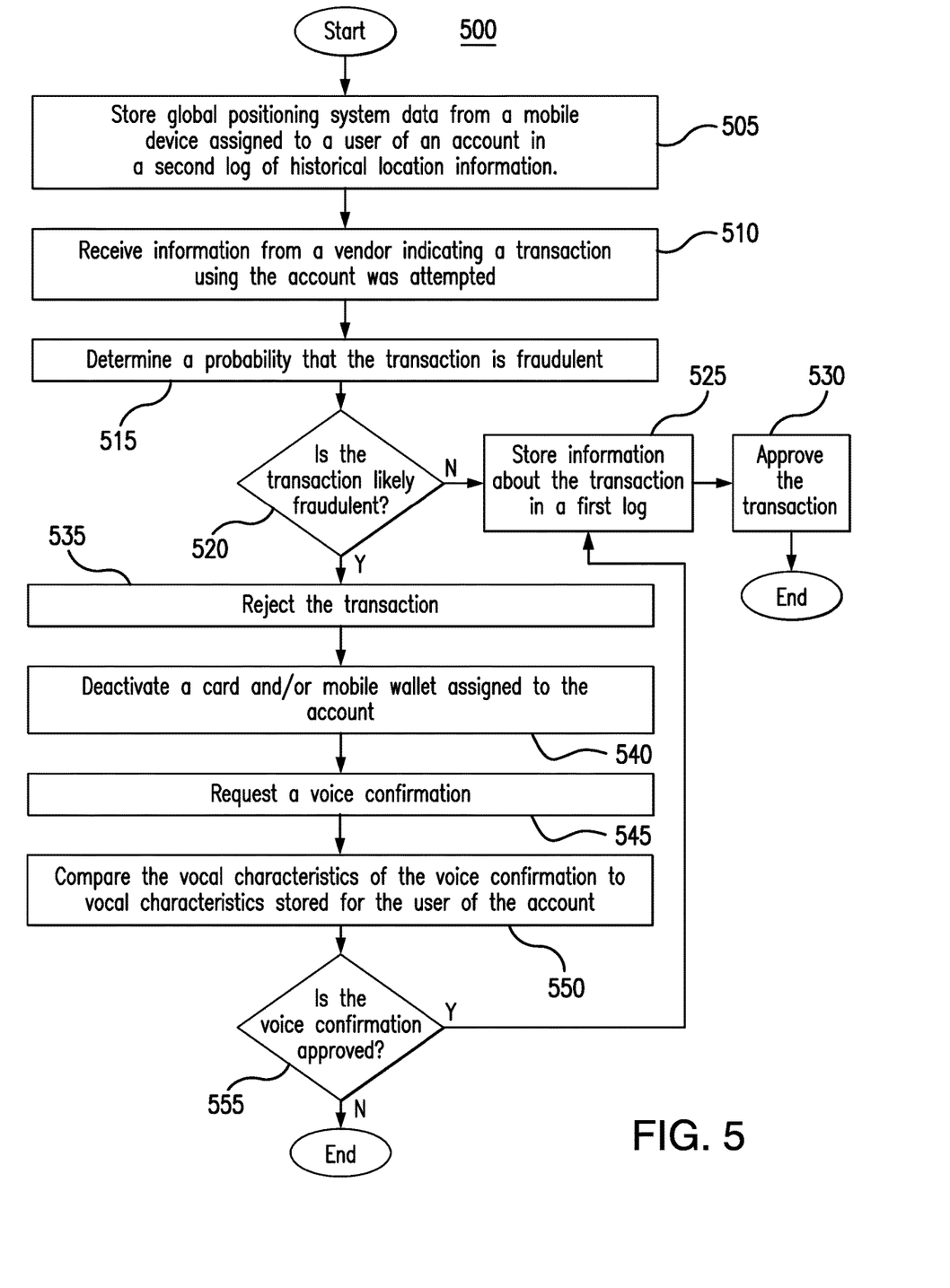
FIG. 5 presents a flowchart illustrating the process by which the security tool in the system of FIG. 1 determines that a transaction is likely fraudulent and takes action based on this determination.

FIG. 5 further illustrates the process by which security tool 130 determines a probability that an attempted transaction using a payment card or mobile wallet is fraudulent, and takes action based on such determination. In step 505, security tool 130 stores GPS data received from a mobile device 110 assigned to a user 105 of an account in a second log 150 of historical location information. In step 510, security tool 130 receives a transaction request 165 from a vendor 120 containing information indicating that a transaction using the account was attempted. In step 515, security tool 130 determines a probability that the attempted transaction is fraudulent, and in step 520, security tool 130 uses this probability to determine if the transaction is likely fraudulent. This determination involves comparing the probability the attempted transaction is fraudulent to a set threshold. If the probability the attempted transaction is fraudulent is less than the set threshold, the transaction is not likely fraudulent. On the other hand, if the probability the attempted transaction is fraudulent is greater than the set threshold, the transaction is likely fraudulent.

In certain embodiments, the value for the set threshold is set by the card/mobile wallet provider. For example, the provider may choose a value for the set threshold that maximizes revenue, taking into account revenue lost due to reimbursements made to users 105 for false negatives—in which security tool 130 approves a transaction that is actually fraudulent—and revenue lost due to dissatisfied users, who choose to use alternative payment methods after becoming frustrated over having their payment declined as a result of false positives.

In further embodiments, user 105 is able to adjust the set threshold by sending a request to security tool 130. For example, a user 105 may wish to lower the set threshold prior to attempting transactions that are not typical of the user's past behavior.

If security tool 130 determines that the transaction is not likely fraudulent, in step 525, security tool 130 next stores information about the transaction in first log 145. In certain embodiments, these details include the time of the transaction, the location of the vendor, and the amount of the transaction. Then, in step 530, security tool 130 sends a message 190 to vendor device 125, approving the transaction.

If security tool 130 determines that the transaction is likely fraudulent, in step 535, security tool 130 next rejects the transaction. Then, in step 540, security tool 130 deactivates a payment card and/or a mobile wallet assigned to the account of user 105. In step 545, security tool 130 sends a request 180 to mobile device 110 seeking a voice confirmation 185 from user 105, approving the transaction.

In step 550, security tool 130 receives voice confirmation 185 from mobile device 110 and compares the vocal characteristics of voice confirmation 185 to vocal characteristics 155 stored in memory 140. In certain embodiments, this comparison includes forming a first vector 330 using the vocal characteristics of voice confirmation 185, forming a second vector 335 using the vocal characteristics 155 stored in memory 140, and determining a comparison value 340 based on the distance between the two vectors. If comparison value 340 is less than a set tolerance 345, security tool 130 accepts the voice confirmation 185 in step 555. If comparison value 340 is greater than the set tolerance 345, security tool 130 rejects the voice confirmation 185 in step 555.

If security tool 130 accepts the voice confirmation 185 in step 555, this means that user 105 has confirmed that the attempted transaction is not actually fraudulent, despite the high probability of fraud determined by security tool 130. As a result, security tool 130 next stores information about the transaction in first log 145, in step 525. Then, in step 530, security tool 130 sends a message 190 to vendor device 125 approving the transaction.

Modifications, additions, or omissions may be made to method 500 depicted in FIG. 5. Method 500 may include more, fewer, or other steps. For example, steps may be performed in parallel or in any suitable order. While discussed as security tool 130 (or components thereof) performing the steps, any suitable component of system 100, such as mobile device(s) 110, for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of the appended claims.

What is claimed is:

1. An apparatus comprising:
a memory configured to store:
a first log comprising historical transaction information;
a second log comprising historical location information, the historical location information comprising:
a set of global positioning system (GPS) coordinates associated with a user, the set of GPS coordinates comprising GPS coordinates of locations of the user over time; and a set of time intervals, each time interval associated with GPS coordinates of the set of GPS coordinates and indicating an interval of time during which a mobile device of the user was located at the associated GPS coordinates; and
a third log comprising a first set of voice characteristic data assigned to an account belonging to the user;
a hardware processor communicatively coupled to the memory, the hardware processor configured to:
receive global positioning system data from the mobile device of the user of the account;
store the global positioning system data in the second log;
receive account information from a vendor, the account information indicating that a transaction using the account was attempted;
determine, using a first machine learning algorithm based on the historical transaction information and an amount of the transaction, a first probability that the user would conduct the transaction;
determine, using a second machine learning algorithm, based on the historical location information, a time of the transaction, and the global positioning system data received from the mobile device, a second probability that the user is at a location of the vendor, wherein the global positioning system data does not correspond to the location of the vendor, and the second probability is non-zero;
determine, based on the first probability and the second probability, a probability that the transaction is fraudulent;
determine that the probability that the transaction is fraudulent is greater than a set threshold;
in response to determining that the probability that the transaction is fraudulent is greater than the set threshold:
reject the transaction;
deactivate a card assigned to the user of the account;
deactivate a mobile wallet stored on the mobile device of the user of the account;
send a notification to the mobile device indicating fraudulent activity has been detected and requesting a voice confirmation;
receive the voice confirmation from the mobile device;
split the voice confirmation into a second set of voice characteristic data;
determine, based on a comparison between the second set of voice characteristic data and the first set of voice characteristic data, that the voice confirmation was generated by the user of the account;
in response to determining that the voice confirmation was generated by the user of the account:
reactivate the card and the mobile wallet;
store a set of information describing the transaction in the first log, the set of information comprising:
a location of the vendor;
a time of the transaction; and
an amount of the transaction;
determine that the probability that the transaction is fraudulent is less than the set threshold; and
in response to determining that the probability that the transaction is fraudulent is less than the set threshold, authorize the transaction.

2. The apparatus of claim 1, wherein the set threshold is set by the user of the account.

3. The apparatus of claim 2, wherein the processor is further configured to receive a request from the user to change the set threshold to a new threshold and in response to receiving the request from the user, change the set threshold to the new threshold.

4. The apparatus of claim 1, wherein:
the memory is further configured to store an authentication phrase assigned to the user of the account; and
the process of determining that the voice confirmation was generated by the user of the account further comprises determining that the voice confirmation corresponds to the authentication phrase.

5. The apparatus of claim 1, wherein the notification requesting the voice confirmation comprises a request to speak a phrase displayed in the notification to verify the transaction.

6. The apparatus of claim 1, wherein the second machine learning algorithm is trained based on the historical location information of the second log to predict a location of the user at the time of the transaction, the training comprising determining a best fit model for the historical location information of the second log.

7. The apparatus of claim 1, wherein the first set of voice characteristic data assigned to the user comprises pitch information, timber information, intonation information, and tone information.

8. A method comprising:
receiving global positioning system data from a mobile device of a user of an account;
storing the global positioning system data in a second log comprising historical location information, the historical location information comprising:
a set of global positioning system (GPS) coordinates associated with the user, the set of GPS coordinates comprising GPS coordinates of locations of the user over time; and
a set of time intervals, each time interval associated with GPS coordinates of the set of GPS coordinates and indicating an interval of time during which the mobile device was located at the associated GPS coordinates; and
receiving account information from a vendor, the account information indicating that a transaction using the account was attempted;
determining, using a first machine learning algorithm, based on the historical transaction information and an amount of the transaction, a first probability that the user would conduct the transaction;
determining, using a second machine learning algorithm, based on the historical location information, a time of the transaction, and the global positioning system data received from the mobile device, a second probability that the user is at a location of the vendor, wherein the global positioning system data does not correspond to the location of the vendor, and the second probability is non-zero;
determining, based on the first probability and the second probability, a probability that the transaction is fraudulent;
determining that the probability that the transaction is fraudulent is greater than a set threshold;
in response to determining that the probability that the transaction is fraudulent is greater than the set threshold:
rejecting the transaction;
deactivating a card assigned to the user of the account;

deactivating a mobile wallet stored on the mobile device of the user of the account;
sending a notification to the mobile device indicating fraudulent activity has been detected and requesting a voice confirmation;
receiving the voice confirmation from the mobile device;
splitting the voice confirmation into a second set of voice characteristic data;
determining, based on a comparison between the second set of voice characteristic data and a first set of voice characteristic data assigned to the user of the account and stored in a third log, that the voice confirmation was generated by the user of the account;
in response to determining that the voice confirmation was generated by the user of the account:
reactivating the card and the mobile wallet;
storing a set of information describing the transaction in the first log, the set of information comprising:
a location of the vendor;
a time of the transaction; and
an amount of the transaction;
determining that the probability that the transaction is fraudulent is less than the set threshold; and
in response to determining that the probability that the transaction is fraudulent is less than the set threshold, authorizing the transaction.

9. The method of claim 8, wherein the set threshold is set by the user of the account.

10. The method of claim 9, wherein the method further comprises receiving a request from the user to change the set threshold to a new threshold and in response to receiving the request from the user, changing the set threshold to the new threshold.

11. The method of claim 8, wherein determining that the voice confirmation was generated by the user of the account further comprises determining that the voice confirmation corresponds to an authentication phrase assigned to the user of the account.

12. The method of claim 8, wherein the notification requesting the voice confirmation comprises a request to speak a phrase displayed in the notification to verify the transaction.

13. The method of claim 8, wherein the second machine learning algorithm is trained based on the historical location information of the second log to predict a location of the user at the time of the transaction, the training comprising determining a best fit model for the historical location information of the second log.

14. The method of claim 8, wherein the first set of voice characteristic data assigned to the user comprises pitch information, timber information, intonation information, and tone information.

15. A system comprising:
a storage element operable to store:
a first log comprising historical transaction information;
a second log comprising historical location information, the historical location information comprising:
a set of global positioning system (GPS) coordinates associated with a user, the set of GPS coordinates comprising GPS coordinates of locations of the user over time; and
a set of time intervals, each time interval associated with GPS coordinates of the set of GPS coordinates and indicating an interval of time during which a mobile device of the user was located at the associated GPS coordinates; and
a third log comprising a first set of voice characteristic data assigned to an account belonging to the user;
a processing element communicatively coupled to the storage element, the processing element operable to:
receive global positioning system data from the mobile device of the user of the account;
store the global positioning system data in the second log;
receive account information from a vendor, the account information indicating that a transaction using the account was attempted;
determine, using a first machine learning algorithm, based on the historical transaction information and an amount of the transaction, a first probability that the user would conduct the transaction;
determine, using a second machine learning algorithm, based on the historical location information, a time of the transaction, and the global positioning system data received from the mobile device, a second probability that the user is at a location of the vendor, wherein the global positioning system data does not correspond to the location of the vendor, and the second probability is non-zero;
determine, based on the first probability and the second probability, a probability that the transaction is fraudulent;
determine that the probability that the transaction is fraudulent is greater than a set threshold;
in response to determining that the probability that the transaction is fraudulent is greater than the set threshold:
reject the transaction;
deactivate a card assigned to the user of the account;
deactivate a mobile wallet stored on the mobile device of the user of the account;
send a notification to the mobile device indicating fraudulent activity has been detected and requesting a voice confirmation;
receive the voice confirmation from the mobile device;
split the voice confirmation into a second set of voice characteristic data;
determine, based on a comparison between the second set of voice characteristic data and the first set of voice characteristic data, that the voice confirmation was generated by the user of the account;
in response to determining that the voice confirmation was generated by the user of the account:
reactivate the card and the mobile wallet;
store a set of information describing the transaction in the first log, the set of information comprising:
a location of the vendor;
a time of the transaction; and
an amount of the transaction;
determine that the probability that the transaction is fraudulent is less than the set threshold; and
in response to determining that the probability that the transaction is fraudulent is less than the set threshold, authorize the transaction.

16. The system of claim 15, wherein the set threshold is set by the user of the account.

17. The system of claim 16, wherein the processing element is further configured to receive a request from the user to change the set threshold to a new threshold and in response to receiving the request from the user, changes the set threshold to the new threshold.

18. The system of claim 15, wherein:
- the storage element is further configured to store an authentication phrase assigned to the user of the account; and
- the process of determining that the voice confirmation was generated by the user of the account further comprises determining that the voice confirmation corresponds to the authentication phrase.

19. The system of claim 15, wherein the notification requesting the voice confirmation comprises a request to speak a phrase displayed in the notification to verify the transaction.

20. The system of claim 15, wherein the first set of voice characteristic data assigned to the user comprises pitch information, timber information, intonation information, and tone information.

\* \* \* \* \*